(12) United States Patent
Süling et al.

(10) Patent No.: US 6,500,907 B1
(45) Date of Patent: Dec. 31, 2002

(54) CATALYST SYSTEM WITH ALUMINUM FLUORIDE ACTIVATOR

(75) Inventors: Carsten Süling, Frankenthal (DE); Marc Oliver Kristen, Limburgerhof (DE); Günther Schweier, Friedelsheim (DE); Andrei Gonioukh, Dudenhofen (DE); Gerhard Hauck, Iggelheim (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 09/673,148

(22) PCT Filed: Apr. 12, 1999

(86) PCT No.: PCT/EP99/02449

§ 371 (c)(1),
(2), (4) Date: Oct. 11, 2000

(87) PCT Pub. No.: WO99/55739

PCT Pub. Date: Nov. 4, 1999

(30) Foreign Application Priority Data

Apr. 24, 1998 (DE) .......................... 198 18 219

(51) Int. Cl.$^7$ .............................. C08F 4/14; C08F 4/64; C08F 4/68; C08F 4/69
(52) U.S. Cl. ................. 526/127; 502/104; 502/117; 502/103; 502/132; 502/155; 526/134; 526/160; 526/161; 526/169; 526/170; 526/172; 526/943
(58) Field of Search ................. 526/160, 943, 526/134, 161, 127, 172, 169, 170; 502/117, 132, 155, 104

(56) References Cited

U.S. PATENT DOCUMENTS

| 4,404,344 A | | 9/1983 | Sinn et al. | |
|---|---|---|---|---|
| 6,159,888 A | * | 12/2000 | Welch et al. | ............... 502/117 |

FOREIGN PATENT DOCUMENTS

| DD | 265 150 | | 2/1989 |
|---|---|---|---|
| DD | 265 150 A1 | * | 2/1989 |
| EP | 035 242 | | 9/1981 |
| EP | 574 258 | | 12/1993 |
| EP | 574 258 A2 | * | 12/1993 |
| WO | 591 756 | | 4/1994 |
| WO | 97/21742 | | 6/1997 |
| WO | 98/11144 | | 3/1998 |

OTHER PUBLICATIONS

J.Am.Chem.Soc.,1991,113,3623–3625,Yang et al.

* cited by examiner

Primary Examiner—David W. Wu
Assistant Examiner—R. Rabago
(74) Attorney, Agent, or Firm—Keil & Weinkauf

(57) ABSTRACT

Catalyst system suitable for polymerizing unsaturated monomers and comprising active constituents obtainable by reacting A) a transition metal compound with
B) aluminum trifluoride,
C) a cation-forming compound and, if desired,
D) further components.

7 Claims, No Drawings

CATALYST SYSTEM WITH ALUMINUM FLUORIDE ACTIVATOR

The present invention relates to a catalyst system suitable for polymerizing unsaturated monomers and comprising active constituents obtainable by reacting
- A) a transition metal compound with
- B) aluminum trifluoride,
- C) a cation-forming compound and, if desired,
- D) further components.

The present invention also relates to the use of aluminum trifluoride as activator in a catalyst system, to a process for preparing a catalyst system, to a process for preparing polymers based on monomers having C—C double bond and/or C—C triple bond, and to the use of a catalyst system for forming carbon-carbon covalent bonds or carbon-heteroatom covalent bonds.

It is known that the following reactions, for example, can be performed in preparing metal compounds that are active in polymerization, such as metallocenium ion catalysts:
- a) metallocenedialkyl+strong cation-forming compound (Lewis acid), X. Yang, C. L. Stern. T. F. Marks, J. Am. Chem. Soc. 1991, 113, 3623–5
- b) metallocenedialkyl+Brönsted acid with non-nucleophilic anion, EP 0 591 756 (Idemitsu Kosan)
- c) metallocene compound+aluminoxane EP 0 035 242 (BASF AG)

Reactions a) and b) have the common feature that they are severely restricted in terms of the choice of activator; that is, of the strong cation-forming compound and of the Brönsted acid with non-nucleophilic anion. Only very specific, preferably perfluoroaromatic, boron compounds lead to a usable activator. Reaction c) requires large amounts of expensive aluminoxane, which is a disruptive factor in the resulting polymer.

There is therefore a desire to prepare active catalysts based on inexpensive, readily available and widely applicable activators. R. Taube in DD 265 150 A1 describes the polymerization of 1,3-butadiene in the presence of a mixture of nickel cyclodecatriene or nickel acetylacetonate with aluminum triethyl and aluminum trifluoride. The polymerization of other monomers, especially alkenes or styrene and its derivatives, and other catalysts, comprising aluminum trifluoride plus a cation-forming compound, are not mentioned.

It is an object of the present invention to provide a catalyst system which is not severely restricted in terms of the choice of activator. This means that even customary cation-forming compounds commonly employed in preparative organic chemistry, such as hexafluoroantimonic acid $HSbF_6$, antimony pentafluoride $SbF_5$, and trifluoromethanesulfonic acid $CF_3SO_3H$, could be used to generate transition metal catalysts. In addition, the catalyst system ought to be able to function per se as a supported catalyst or to be convertible to such a catalyst.

We have found that this object is achieved by the catalyst system defined at the outset, by the use of aluminum trifluoride in the catalyst system defined at the outset, by a process for preparing the catalyst system defined at the outset, by a process for preparing polymers using the catalyst system defined at the outset, and by the use of the catalyst system defined at the outset for forming carbon-carbon covalent bonds or carbon-heteroatom covalent bonds.

Suitable transition metal compounds A) are in principle all those which react with components B), C) and, if used, D) chemically to form an active catalyst.

Examples of highly suitable transition metal compounds A) are transition metal complexes with a ligand of the formulae F-I to F-IV

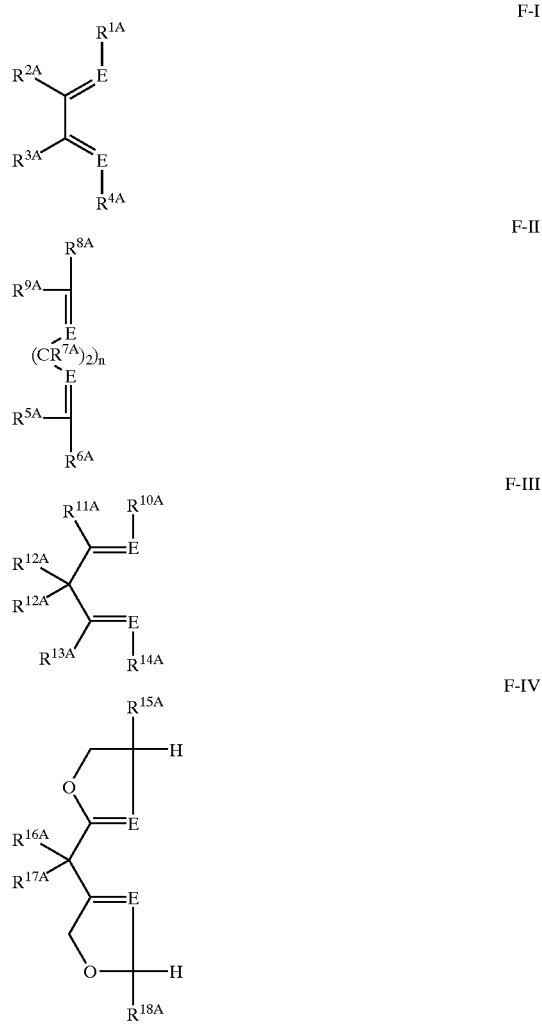

where the transition metal is selected from the elements Ti, Zr, Hf, Sc, V, Nb, Ta, Cr, Mo, W, Fe, CO, Ni, Pd and Pt or from an element of the rare earth metals. Preference is given here to compounds of nickel and palladium as the central metal.

E is an element from group 15 of the Periodic Table of the Elements (5th main group), preferably N or P and, with particular preference, N. The two atoms E in a molecule can be the same or different.

The radicals $R^{1A}$ to $R^{18A}$, which can be the same or different, are as follows:

$R^{1A}$ and $R^{4A}$ are independently of one another hydrocarbon radicals or substituted hydrocarbon radicals, preferably those where the carbon adjacent to the element E is attached to at least two carbon atoms.

$R^{2A}$ and $R^{3A}$ are independently of one another hydrogen, hydrocarbon or substituted hydrocarbon radicals or else together form a ring system which may also include one or more heteroatoms.

$R^{6A}$ is hydrocarbon or substituted hydrocarbon radicals, $R^{5A}$ is hydrogen, hydrocarbon or substituted hydrocarbon radicals, $R^{6A}$ and $R^{5A}$ may also together form a ring system.

$R^{8A}$ is hydrocarbon or substituted hydrocarbon radicals, $R^{9A}$ is hydrogen, hydrocarbon or substituted hydrocarbon radicals, $R^{8A}$ and $R^{9A}$ may also together form a ring system.

$R^{7A}$ each independently of the others is hydrogen, hydrocarbon or substituted hydrocarbon radicals, it also being possible for two radicals $R^{7A}$ to form a ring system. n is an integer between 1 and 4, preferably 2 or 3.

$R^{10A}$ and $R^{14A}$ independently of one another are hydrogen, hydrocarbon or substituted hydrocarbon radicals.

$R^{11A}$, $R^{12A}$ and $R^{13A}$ independently of one another are hydrogen, hydrocarbon or substituted hydrocarbon radicals, where two or more radicals $R^{11A}$, $R^{12A}$ and $R^{13A}$ may also together form a ring system.

$R^{15A}$ and $R^{18A}$ independently of one another are hydrogen, hydrocarbon or substituted hydrocarbon radicals.

$R^{16A}$ and $R^{17A}$ independently of one another are hydrogen, hydrocarbon or substituted hydrocarbon radicals.

Examples of particularly suitable compounds F-I to F-IV are:

Di(2,6-di-i-propylphenyl)-2,3-dimethyldiazabutadiene-palladium dichloride Di(di-i-propylphenyl)-2,3-dimethyldiazabutadienenickel dichloride Di(2,6-di-i-propylphenyl)-dimethyldiazabutadienepalladium dimethyl Di(2,6-di-i-propylphenyl)-2,3-dimethyldiazabutadienenickel dimethyl Di(2,6-dimethylphenyl)-2,3-dimethyldiazabutadienepalladium dichloride Di(2,6-dimethylphenyl)-2,3-dimethyldiazabutadienenickel dichloride Di(2,6-dimethylphenyl)-2,3-dimethyldiazabutadienepalladium dimethyl Di(2,6-dimethylphenyl)-2,3-dimethyldiazabutadienenickel dimethyl Di(2-methylphenyl)-2,3-dimethyldiazabutadienepalladium dichloride Di(2-methylphenyl)-2,3-dimethyldiazabutadienenickel dichloride Di(2-methylphenyl)-2,3-dimethyldiazabutadienepalladium dimethyl Di(2-methylphenyl)-2,3-dimethyldiazabutadienenickel dimethyl Diphenyl-2,3-dimethyldiazabutadienepalladium dichloride Diphenyl-2,3-dimethyl-diazabutadienenickel dichloride Diphenyl-2,3-dimethyl-diazabutadienepalladium dimethyl Diphenyl-2,3-dimethyl-diazabutadienenickel dimethyl Di(2,6-dimethylphenyl)-azanaphthenepalladium dichloride Di(2,6-dimethylphenyl)-azanaphthenenickel dichloride Di(2,6-dimethylphenyl)-azanaphthenepalladium dimethyl Di(2,6-dimethylphenyl)-azanaphthenenickel dimethyl 1,1'-Dipyridylpalladium dichloride 1,1'-Dipyridylnickel dichloride 1,1'-Dipyridylpalladium dimethyl 1,1'-Dipyridylnickel dimethyl Further particularly suitable transition metal compounds A) are those having at least one cyclopentadienyl-type ligand, which are commonly known as metallocene complexes (two or more cyclopentadienyl-type ligands) or half-sandwich complexes (one cyclopentadienyl-type ligand).

Particularly suitable metallocene complexes are those of the formula

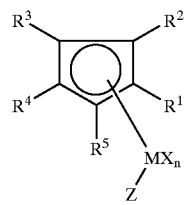

I where

M is titanium, zirconium, hafnium, vanadium, niobium or tantalum or an element from subgroup III of the Periodic Table or from the lanthanoids, X is fluorine, chlorine, bromine, iodine, hydrogen, $C_1$–$C_{10}$-alkyl, $C_6$–$C_{15}$-aryl, alkylaryl having 1 to 10 carbons in the alkyl radical and 6 to 20 carbons in the aryl radical, —$OR^6$ or —$NR^6R^7$, n is an integer between 1 and 3, n corresponding to the valence of M minus 2, and where $R^6$ and $R^7$ are $C_1$–$C_{10}$-alkyl, $C_6$–$C_{15}$-aryl, alkylaryl, arylalkyl, fluoroalkyl or fluoroaryl having in each case 1 to 10 carbons in the alkyl radical and 6 to 20 carbons in the aryl radical, $R^1$ to $R^5$ are hydrogen, $C_1$–$C_{10}$-alkyl, 5–7 membered cycloalkyl which can in turn carry a $C_1$–$C_{10}$-alkyl as substituent, $C_6$–$C_{15}$-aryl or arylalkyl, where two adjacent radicals may if desired together be saturated or unsaturated cyclic groups having 4 to 15 carbons, or are $Si(R^8)_3$ where $R^8$ is $C_1$–$C_{10}$-alkyl, $C_3$–$C_{10}$-cycloalkyl or $C_6$–$C_{15}$-aryl,

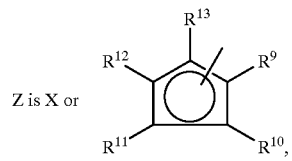

Z is X or and where the radicals $R^9$ to $R^{13}$ are hydrogen, $C_1$–$C_{10}$-alkyl, 5–7-membered cycloalkyl which can in turn carry a $C_1$–$C_{10}$-alkyl substituent, $C_6$–$C_{15}$-aryl or arylalkyl and where two adjacent radicals may if desired together be saturated or unsaturated cyclic groups having 4 to 15 carbons, or are $Si(R^{14})_3$ where $R^{14}$ is $C_1$–$C_{10}$-alkyl, $C_6$–$C_{15}$-aryl or $C_3$–$C_{10}$-cycloalkyl, or where the radicals $R^4$ and Z together form a group —$R^{15}$—A— in which

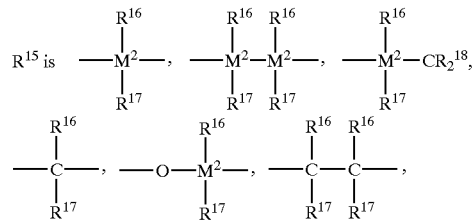

=$BR^{16}$, =$AlR^{16}$, —Ge—, —Sn—, —O—, —S—, =SO, =$SO_2$, =$NR^{16}$, =CO, =$PR^{16}$ or =$P(O)R^{16}$, where $R^{16}$, $R^{17}$ and $R^{18}$ are the same or different and are hydrogen, halogen, $C_1$–$C_{10}$-alkyl, $C_1$–$C_{10}$-fluoroalkyl, $C_6$–$C_{10}$-fluoroaryl, $C_6$–$C_{10}$-aryl, $C_1$–$C_{10}$-alkoxy, $C_2$–$C_{10}$-alkenyl, $C_7$–$C_{40}$-arylalkyl, $C_8$–$C_{40}$-arylalkenyl or $C_7$–$C_{40}$-alkylaryl, or where two adjacent radicals in each case form a ring with the atoms linking them, and $M^2$ is silicon, germanium or tin, A is —O—, —S—, >NR$^{19}$ or >PR$^{19}$, where $R^{19}$ is $C_1$–$C_{10}$-alkyl, $C_6$–$C_{15}$-aryl, $C_3$–$C_{10}$-cycloalkyl, alkylaryl or Si($R^{20}$)$_3$, $R^{20}$ is hydrogen, $C_1$–$C_{10}$-alkyl, $C_6$–$C_{15}$-aryl which may in turn be substituted by $C_1$–$C_4$-alkyls, or is $C_3$–$C_{10}$-cycloalkyl or where the radicals $R^4$ and $R^{12}$ together form a group —$R^{15}$—.

Preference among the metallocene complexes of the formula I is given to

Ia

Ib

Ic and

Id

The radicals X can be the same or different, but preferably are the same.

Of the compounds of the formula Ia, particular preference is given to those in which M is titanium, zirconium or hafnium, X is chlorine, $C_1$–$C_4$-alkyl or phenyl, n is 2 and $R^1$ to $R^5$ are hydrogen or $C_1$–$C_4$-alkyl.

Of the compounds of the formula Ib, preference is given to those in which

M is titanium, zirconium or hafnium,

X is chlorine, $C_1$–$C_4$-alkyl or phenyl, n is 2, $R^1$ to $R^5$ are hydrogen, $C_1$–$C_4$-alkyl or Si($R^8$)$_3$, and $R^9$ to $R^{13}$ are hydrogen, $C_1$–$C_4$-alkyl or Si($R^{14}$)$_3$, Particularly suitable compounds of formula Ib are those in which the cyclopentadienyl radicals are the same.

Examples of particularly suitable compounds include:

bis(cyclopentadienyl)zirconium dichloride, bis (pentamethylcyclopentadienyl)zirconium dichloride, bis(methylcyclopentadienyl)zirconium dichloride, bis (ethylcyclopentadienyl)zirconium dichloride, bis(n-butylcyclopentadienyl)zirconium dichloride and bis (trimethylsilylcyclopentadienyl)zirconium dichloride and the corresponding dimethylzirconium compounds.

Particularly suitable compounds of the formula Ic are those in which $R^1$ and $R^9$ are the same and are hydrogen or $C_1$–$C_{10}$-alkyls, $R^5$ and $R^{13}$ are the same and are hydrogen, methyl, ethyl, isopropyl or tert-butyl, $R^2$, $R^3$, $R^{10}$ and $R^{11}$ are such that $R^3$ and $R^{11}$ are $C_1$–$C_4$-alkyl $R^2$ and $R^{10}$ are hydrogen or else two adjacent radicals $R^2$ and $R^3$ and also $R^{10}$ and $R^{11}$ are together cyclic groups having 4 to 12 carbons, $$R^{15} \text{ is } \begin{array}{c} R^{16} \\ | \\ -M^2- \\ | \\ R^{17} \end{array} \text{ or } \begin{array}{c} R^{16} \;\; R^{16} \\ | \;\;\;\;\; | \\ -C-C- \\ | \;\;\;\;\; | \\ R^{17} \;\; R^{17} \end{array},$$

M is titanium, zirconium or hafnium and $M^2$ is silicon

X is chlorine, $C_1$–$C_4$-alkyl or phenyl.

Examples of particularly suitable complex compounds Ic include:

Dimethylsilanediylbis(cyclopentadienyl)zirconium dichloride, dimethylsilanediylbis(indenyl)zirconium dichloride, dimethylsilanediylbis(tetrahydroindenyl) zirconium dichloride, ethylenebis(cyclopentadienyl) zirconium dichloride, ethylenebis(indenyl)zirconium dichloride, ethylenebis(tetrahydroindenyl) zirconium dichloride, tetramethylethylene-9-fluorenylcyclopentadienylzirconium diechloride, dimethylsilanediylbis(3-tert-butyl-5-methylcyclopentadienyl)-zirconium dichloride, dimethylsilanediylbis(3-tert-butyl-5-ethylcyclopentadienyl)-zirconium dichloride, dimethylsilanediylbis(2-methylindenyl)zirconium dichloride, dimethylsilanediylbis(2-isopropylindenyl) zirconium dichloride, dimethylsilanediylbis(2-tert-butylindenyl)zirconium dichloride, diethylsilanediylbis (2-methylindenyl)zirconium dibromide, dimethyl-silanediylbis(3-methyl-5-methylcyclopentadienyl)-zirconium dichloride, dimethylsilanediylbis(3-ethyl-5-isopropylcyclopentadienyl)-zirconium dichloride, dimethylsilanediylbis (2-ethylindenyl)zirconium dichloride, dimethylsilanediylbis(2-methylbenzindenyl)zirconium dichloride dimethylsilanediylbis(2-ethylbenzindenyl)zirconium dichloride, ethylphenylsilanediylbis(2-ethylbenzindenyl) zirconium dichloride, ethylphenylsilanediylbis(2-methylbenzindenyl)zirconium dichloride, diphenylsilanediylbis(2-methylbenzindenyl)zirconium dichloride, diphenylsilanediylbis(2-ethylbenzindenyl) zirconium dichloride, and diphenylsilanediylbis(2-methylindenyl)hafnium dichloride and also the corresponding dimethylzirconium compounds.

Further examples of suitable complex compounds Ic include:

Dimethylsilanediylbis(2-methyl-4-phenylindenyl) zirconium dichloride, dimethylsilanediylbis(2-methyl-4-[1-naphthylindenyl])zirconium dichloride, Dimethylsilanediylbis(2-methyl-4-isopropylindenyl) zirconium dichloride, Dimethylsilanediylbis(2-methyl-4,6-diisopropylindenyl)zirconium dichloride, dimethylsilanediylbis(2-ethyl-4-phenylindenyl) zirconium dichloride, Dimethylsilanediylbis(2-methyl-4-(para-4-butyl)phenylindenyl) zirconium dichloride, and also the corresponding dimethylzirconium compounds.

Particularly suitable compounds of the formula Id are those in which

M is titanium or zirconium

X is chlorine, $C_1$–$C_4$-alkyl or phenyl.

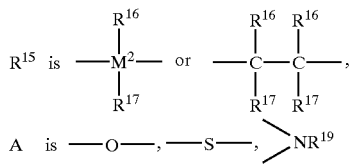

and $R^1$ to $R^3$ and $R^5$ are hydrogen, $C_1$–$C_{10}$-alkyl, $C_3$–$C_{10}$-cycloalkyl, $C_6$–$C_{15}$-aryl or $Si(R^8)_3$ or where two adjacent radicals are cyclic groups having 4 to 12 carbons.

The synthesis of complex compounds of this kind can be carried out in accordance with methods known per se, preference being given to the reaction of the correspondingly substituted cyclic hydrocarbon anions with halides of titanium, zirconium, hafnium, vanadium, niobium or tantalum.

Examples of appropriate preparation techniques are described, inter alia, in Journal of Organometallic Chemistry, 369 (1989), 359–370.

It is also possible to employ mixtures of different metallocene complexes.

Component B) is aluminum trifluoride. This is a known compound which is described, for example, in Holleman-Wiberg, Lehrbuch d. Anorgan. Chemie, 101st Ed. 1995, p. 1073 ff, Walter de Gruyter (Berlin, N.Y.). It can be in either crystalline or, preferably, amorphous form. A very suitable process for preparing amorphous aluminum trifluoride is the reaction of aluminum triorganyls with, for example, boron trifluoride etherate, as described in R. Taube, Macromol. Chem. 194 (1993), 1273–1288. the aluminum trifluoride B) can be isolated preparatively or prepared in situ for use.

The molar ratio of aluminum trifluoride B) to metal complex A) is from 10,000:1 to 1:1, preferably from 100:1 to 1:1 and, with particular preference, from 50:1 to 1:1.

The cation-forming compound C) is generally a Lewis acid (electrically neutral or positively charged) or a Brönsted acid. Suitable neutral Lewis acids are preferably those which form a non-nucleophilic anion after reaction with the transition metal component A). Suitable positively charged Lewis acids, and suitable Brönsted acids, are preferably those having a conjugated anion with little or virtually no nucleophilicity.

One of the features of the invention is that both moderate and strong Lewis acids, and anions of little to virtually no nucleophilicity, can be used to generate a catalyst.

Suitable cation-forming compounds C) from the class of the moderate neutral and positively charged Lewis acids are compounds of elements of Groups 13 to 15 of the Periodic Table of the Elements, of the formula $MetR'_n$, where Met is an element from groups 13 to 15 of the Periodic Table of the Elements, R' is inorganic or organic radicals which can be the same or different, and n is an integer from 3 to 5 and represents the valence of Met.

Preference is given in this context to compounds comprising elements of groups 13 and 15 with only halogen atoms as substituents. Particular preference is given to boron trifluoride and antimony pentafluoride.

Positively charged Lewis acids can be selected, for example, from compounds of the formulae $[MetR'_{n+1}]^{\oplus}[An]^{\ominus}$ or $[MetR'_{n-1}]^{\oplus}[An]^{\ominus}$, where Met is an element from groups 13 to 16 of the Periodic Table of the Elements, R' is inorganic or organic radicals which can be the same or different, and n is an integer from 2 to 5 which represents the valence of Met. The nature of the corresponding anion $[An]^{\ominus}$ is not critical per se, with anions such as boron tetrafluoride and antimony hexafluoride, for example, having proven suitable. Positively charged Lewis acids with exclusively organic substituents are preferred. Particular preference is given to compounds such as $C(C_6H_5)_3^{\oplus}BF_4^{\ominus}$ or $O(CH_3)_3^{\oplus}BF_4^{\ominus}$, for example.

Suitable compounds from the class of the Brönsted acids with an anion of low nucleophilicity (b) are those in which the anion is of the formula $MetR'_{n+1}^{\ominus}$ where Met is an element from groups 13 to 15 of the Periodic Table of the Elements, R' is inorganic or organic radicals which can be the same or different, and n is an integer from 3 to 5 and represents the valence of Met. Preference is given to anions carrying exclusively halogen substituents on the central element. Compounds such as $HBF_4$ and $HSbF_6$ are particularly preferred. These compounds can also be in the form of etherates.

A further class of anions of low nucleophilicity which can be used is derived from the formula $R'SO_3^{\oplus}$. In this formula R' is an inorganic or organic radical, preferably an organic $C_1$–$C_{10}$-alkyl or $C_6$–$C_{20}$-aryl radical, where preferably at least some of the hydrogen atoms can be substituted by halogen atoms, preferably by fluorine atoms. Examples of particularly preferred compounds of this class are acids $R'SO_3$-H, such as fluorosulfonic, phenylsulfonic, trifluoromethylsulfonic and pentafluorophenylsulfonic acid.

Strong, neutral Lewis acids as component C) are compounds of the formula (II)

$$M^3X^1X^2X^3 \qquad \qquad \text{II}$$ 

where $M^3$ is an element from main group III of the Periodic Table, especially B, Al or Ga, preferably B, $X^1$, $X^2$ and $X^3$ are hydrogen, $C_1$–$C_{10}$-alkyl, $C_6$–$C_{15}$-aryl, alkylaryl, arylalkyl, haloalkyl or haloaryl each having 1 to 10 carbons in the alkyl radical and 6 to 20 carbons in the aryl radical, or are fluorine, chlorine, bromine or iodine, and in particular are haloaryls, preferably pentafluorophenyl.

Particular preference is given to compounds of the formula II in which $X^1$, $X^2$ and $X^3$ are the same, preferably tris(pentafluorophenyl)borane.

Ionic compounds as component C), having strong Lewis-acid cations, are compounds of the formula III $$[(Y^{a+})Q_1Q_2 \ldots Q_z]^{d+} \qquad \text{III}$$

where

Y is an element of main groups I to VI or of subgroups I to VIII of the Periodic Table, $Q_1$ to $Q_z$ are radicals bearing a single negative charge, such as $C_1$–$C_{28}$-alkyl, $C_6$–$C_{15}$-aryl, alkylaryl, arylalkyl, haloalkyl, haloaryl each having 6 to 20 carbons in the aryl and 1 to 28 carbons in the alkyl radical, $C_3$–$C_{10}$-cycloalkyl, which can be unsubstituted or substituted by $C_1$–$C_{10}$-alkyl groups, or are halogen, $C_1$–$C_{28}$-alkoxy, $C_6$–$C_{15}$-aryloxy, silyl or mercaptyl, a is an integer from 1 to 6 and z is an integer from 0 to 5, d being the difference a-z but being greater than or equal to 1.

Carbonium cations, oxonium cations and sulfonium cations, and also cationic transition metal complexes, are particular suitable. Mention may be made in particular of the triphenylmethyl cation, the silver cation and the 1,1'-dimethylferrocenyl cation. They preferably have noncoordinating counterions, especially boron compounds as are also mentioned in WO 91/09882, preferably tetrakis (pentafluorophenyl)borate.

Ionic compounds as component C) with Brönsted acids as cations and preferably likewise noncoordinating counterions are mentioned in WO 91/09882; a preferred cation is N,N-dimethylanilinium.

The amount of metallocenium ion-forming compound is preferably from 0.1 to 10 equivalents based on the transition metal component A).

Component C) can also consist of or comprise an aluminoxane.

Compounds particularly suitable as the cation-forming component C) are open-chain or cyclic alumoxane compounds of the formula V or VI

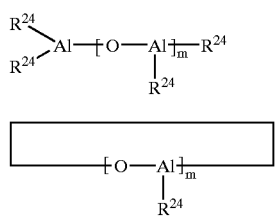

where $R^{24}$ is a $C_1$–$C_4$-alkyl, preferably methyl or ethyl, and m is an integer from 5 to 30, preferably from 10 to 25.

These oligomeric alumoxane compounds are customarily prepared by reacting a solution of trialkylaluminum with water as is described, inter alia, in EP-A 284 708 and U.S. Pat. No. 4,794,096.

In general, the resulting oligomeric alumoxane compounds are in the form of mixtures of both linear and cyclic chain molecules of various length, so that m should be regarded as an average value. The alumoxane compounds can also be present in a mixture with other metal alkyls, preferably with aluminum alkyls.

As component C) it is additionally possible to employ aryloxyalumoxanes as described in U.S. Pat. No. 5,391,793, aminoaluminoxanes as described in U.S. Pat. No. 5,371,260, aminoaluminoxane hydrochlorides as described in EP-A 633 264, siloxyaluminoxanes as described in EP-A 621 279, or mixtures thereof.

It has been found advantageous to use the transition metal compound A) and the oligomeric alumoxane compound in amounts such that the atomic ratio between aluminum from the oligomeric alumoxane compound and the transition metal from the transition metal compound A is from 1:1 to $10^6$:1, preferably from 1:1 to $10^4$:1, and, in particular, from 1:1 to 10:1.

As component D), the catalyst system of the invention may also include, if desired, an organometallic compound, preferably a metal compound of the formula IV $$M^1(R^{21})_r(R^{22})_s(R^{23})_t \qquad \text{IV}$$

where $M^1$ is an alkali metal, an alkaline earth metal or a metal from main group III of the Periodic Table, i.e., boron, aluminum, gallium, indium or thallium, $R^{21}$ is hydrogen, $C_1$–$C_{10}$-alkyl, $C_6$–$C_{15}$-aryl, alkylaryl or arylalkyl having in each case 1 to 10 carbons in the alkyl radical and 6 to 20 carbons in the aryl radical, $R^{22}$ and $R^{23}$ are hydrogen, halogen, $C_1$–$C_{10}$-alkyl, $C_6$–$C_5$-aryl, alkylaryl, arylalkyl or alkoxy having in each case 1 to 10 carbons in the alkyl radical and 6 to 20 carbons in the aryl radical, r is an integer from 1 to 3 and s and t are integers from 0 to 2, the sum r+s+t corresponding to the valence of $M^1$.

Where component D) is present together with A) and/or C), it is not the same as components A) and, especially, C).

Among the metal compounds of formula IV preference is given to those in which $M^1$ is lithium, magnesium or aluminum and $R^{21}$ to $R^{23}$ are $C_1$–$C_{10}$-alkyl.

Particularly preferred metal compounds of the formula IV are n-butyllithium, n-butyl-n-octylmagnesium, n-butyl-n-heptyl-magnesium, tri-n-hexylaluminum, tri-isobutylaluminum, triethylaluminum and trimethylaluminum.

If component D) is employed it is present in the catalyst system in an amount of preferably from 800:1 to 1:1, in particular from 500:1 to 50:1 (molar proportion of $M^1$ from IV to transition metal M from I).

In addition to A), B), C) and, if used, D), the catalyst system may comprise a support substance.

Examples of suitable support substances are organic polymers, but preferably porous inorganic materials.

The support materials employed are preferably finely divided supports having a particle diameter in the range from 0.1 to 1000 μm preferably from 10 to 300 μm, and, in particular, from 30 to 70 μm. Examples of suitable organic supports are finely divided polymers, such as finely divided polyethylene or polypropylene. Examples of suitable inorganic supports are aluminum trioxide, silicon dioxide, titanium dioxide or mixed oxides thereof, aluminum phosphate or magnesium chloride. It is preferred to employ silica gels of the formula $SiO_2 \cdot a\, Al_2O_3$, in which a is a number from 0 to 2, preferably from 0 to 0.5. The support particles can be used in granular form and also spray-dried in microscopic form. Products of this kind are obtainable commercially, examples being Silica Gel 332 from Grace or ES 70×to from Crosfield.

Preferred inorganic support materials are acidic, inorganic metal oxides or semimetal oxides of very high porosity, which are described, for example, in the prior German Patent Application 197 20 980.7, especially on page 3, line 45 to page 5, line 11.

The support materials may have been pretreated thermally or chemically (with metal alkyl compounds, for example) in order to obtain a certain profile of properties of the support (for example, water content and/or hydroxyl content).

The catalyst system of the invention is generally obtained by reacting aluminum fluoride with a transition metal compound A) which has been brought into contact beforehand with a cation former C). This reaction can be conducted in homogeneous liquid phase or else in the presence of a support material, generally with the use of organic solvents as suspension media. The resulting compound can be employed as a catalyst directly, in suspension. An alternative possibility is to isolate the compound and to employ it per se as a catalyst in, for example, gas-phase processes; otherwise, it can be resuspended after isolation and then employed as a catalyst.

The aluminum fluoride B) can also be prepared in situ (for example, by reacting an aluminum alkyl compound with boron trifluoride) and then brought into contact, in the presence or absence of a support material, with the product of reaction of transition metal compound A) and cation former C). The reaction of the transition metal compound A) with the cation former C) can also be conducted in the presence of aluminum fluoride B) and in the presence or absence of a support material.

The catalyst system of the invention is employed to polymerize monomers having a C—C double bond or a C—C triple bond. Said C—C double or C—C triple bond, or both, can be arranged either at the ends of or within the module, either exocyclically or endocyclically. Preferred monomers with C—C triple bond are $C_2$-$C_{10}$-alk-1-ynes, such as ethyne, propyne, 1-butyne, 1-hexyne, and also phenylacetylene. Preferred monomers with a C—C double bond are $C_2$-$C_{20}$-alk-1-enes and $C_8$-$C_{20}$ vinylaromatic compounds. The polymerization process of the Invention is preferably employed to polymerize or copolymerize $C_2$-$C_{12}$-alk-1-enes. Preferred $C_2$-$C_{12}$-alk-1-enes are ethylene, propylene, 1-butene, 1-pentene, 4-methyl-1-pentene, 1-hexene, 1heptene or 1-octene, and vinylaromatic monomers, such as styrene, p-methylstyrene or 2,4-dimethylstyrene, or mixtures of these $C_2$-$C_{12}$-alk-1-enes. Particular preference is given to homopolymers or copolymers of ethylene or of propylene, the proportion of ethylene or-propylene in the copolymers being at least 50 mol %. In the case of ethylene copolymers preference is given to those comprising propylene, 1-butene, 1-hexene, or 1-octene, or mixtures thereof, as further monomers. In the case of propylene copolymers, the copolymers concerned are in particular those comprising ethylene or 1-butene, or mixtures of these, as further monomers.

Preference is given to using the polymerization process of the invention to prepare polymers which comprise from 50 to 100 mol % of ethylene and from 0 to 50 mol %, in particular from 0 to 30 mol %, of $C_3$-$C_{12}$-alk-1-enes.

Preference is also given to those polymers which comprise from 50 to 100 mol % of propylene, from 0 to 50 mol %, in particular from 0 to 30 mol %, of ethylene and from 0 to 20 mol %, in particular from 0 to 10 mol %, of $C_4$-$C_{12}$-alk-1-enes.

The sum of the molar percentages is always 100.

The polymerization can be conducted by the techniques customary for polymerizing olefins, such as solution, suspension, stirred gas-phase or gas-phase fluidized-bed techniques, continuously or batchwise. As solvents or suspension media it is possible to use inert hydrocarbons, such as isobutane, or else the monomers themselves. Particularly suitable techniques for preparing the polymers are the suspension technique and the gas-phase technique (stirred gas phase, gas-phase fluidized bed).

Suitable reactors include continuously operated stirred vessels, loop reactors or fluidized-bed reactors, it also being possible if desired to use two or more reactors connected one after another in a row (reactor cascade).

The polymerization by means of the process of the invention is generally carried out at temperatures in the range from −50 to 300° C., preferably from 0 to 150° C., and under pressures of generally from 0.5 to 3000 bar, preferably from 1 to 80 bar. In the polymerization process of the invention it is advantageous to establish residence times of the respective reaction mixtures of from 0.5 to 5 hours, in particular from 0.7 to 3.5 hours. In the course of the polymerization it is also possible to use, inter alia, antistats and molecular mass regulators, an example being hydrogen.

Apart from for polymerization, the catalyst system of the invention can also be used for stoichiometric or catalytic, nonrepetitive carbon-carbon linkage, and for reducing carbonyl groups >C=O or imino groups >C=NH with carbon radicals, hydrides or amides, and also in the Diels-Alder reaction and in the hydrogenation of unsaturated carbon-carbon, carbon-heteroatom and heteroatom-heteroatom bonds with hydrogen and/or hydrides.

In general, these reactions proceed in the low molecular mass range and they generally lead to products having a molecular weight of less than about 1000.

EXAMPLES

Example 1

Preparing Amorphous $AlF_3$—(0.4–0.6 Toluene)

A 1 l three-necked flask was charged with a solution of 14.9 g (105 mmol) of $BF_3.OEt_2$ in 150 ml of toluene, and 11.4 g (100 mmol) of $AlEt_3$ in 150 ml of toluene were added slowly via a dropping funnel with pressure compensation, with stirring. Interim coagulation was removed by vigorous shaking. The precipitate was isolated by decanting and was dried under reduced pressure at 80° C. This gave 12 g of a fine white powdery substance.

Example 2

Preparing the Catalysts 2.1 Preparation from Metallocene Dialkyls

A 100 ml three-necked flask was charged with a solution of 1 g (3.6 mmol) of $Cp_2ZrMe_2$ in 20 ml of toluene, and 950 mg (4 mmol) of hexafluoroantimonic acid were added. The solution took on a red color. About 15 g of the $AlF_3$ obtained in Ex. 1 were added, and the toluene was removed under reduced pressure. This gave about 16 g of a free-flowing powder (catalyst 1).

2.2 Preparation from Metallocene Dichloride

A 100 ml of three-necked flask was charged with a solution of 1 g (3.1 mmol) of $Cp_2ZrCl_2$ in 20 ml of toluene, and 750 mg (3,5 mmol) of antimonypentafluoride (Aldrich) were added. The solution took on a red color. About 15 g of the $AlF_3$ obtained in Ex. 1 were added and the toluene was removed under reduced pressure. This gave about 15.5 g of a free-flowing powder (catalyst 2)

2.3 Preparation of a Catalyst from dimethylsilylenebis(2-methyl-4,5-benzoindenyl) zirconocene dichloride A 500 ml three-necked flask was charged with a solution of 0.5 g (0.9 mmol) of dimethylsilylenebis(2-methyl-4,5-benzoindenyl)-zirconocene dichloride in 300 ml of toluene, and 215 mg (1 mmol) of antimony pentafluoride (Aldrich) were added. The solution took on a red color. About 5 g of the $AlF_3$ obtained in Example 1 were added and the toluene was removed under reduced pressure. This gave about 5.5 g of a free-flowing powder (catalyst 3).

Example 3

Polymerizing with the Catalysts obtained
3.1 Homopolymerization of Ethylene 4.5 l of isobutane in 80 mg of butyllithium (as a solution in heptane) were charged to a stirred 10 l steel autoclave which had been carefully flushed with nitrogen and conditioned at the polymerization temperature of 70° C. beforehand. Then 200 mg of catalyst 1 or 2 were flushed in with a further 0.5 l of isobutane, and ethylene was injected to a total pressure of 38 bar. The pressure within the autoclave was kept constant by adding further ethylene. After 90 minutes, the polymerization was discontinued by letting down the autoclave. The polymer was obtained in the form of a free-flowing coarse powder. Yield: 1.4 kg (catalyst 1), 1.5 kg (catalyst 2).

3.2 Copolymerization of Ethylene and 1-Hexene 4.5 l of isobutane, 400 ml of 1-hexene and 150 mg of butyllithium (as a solution in heptane) were charged to a stirred 10 l steel autoclave which had been carefully flushed with nitrogen and conditioned at the polymerization temperature of 70° C. beforehand. Then 200 mg of catalyst 1 or 2 were flushed in with a further 0.5 l of isobutane, and ethylene was injected to a total pressure of 38 bar. The pressure within the autoclave was kept constant by adding further ethylene. After 90 minutes, the polymerization was discontinued by letting down the autoclave. The polymer was obtained in the form of a free-flowing coarse powder. Yield: 1.8 kg (catalyst 1), 1.7 kg (catalyst 2).

3.3 Propylene Homopolymerization 100 g of initial polymer charge were placed in an autoclave under a nitrogen countercurrent. At a slow stirring speed (100 rpm) the autoclave was flushed with three times 5 bar of nitrogen. Then mmol of aluminum alkyl (9 ml of 2-molar TiBal and 1 ml of 2-molar DiBAH solutions in heptane) were added via the feed port, under the nitrogen countercurrent, and the autoclave was again flushed. The catalyst (200 mg of catalyst 3) was introduced in solid form via the feed port, using an introduction tube, in the nitrogen countercurrent. Then 7 l of liquid propylene were placed in the autoclave. The autoclave was heated to 70–75° C. and the stirrer speed was increased. On reaching the target temperature (65° C.) polymerization was conducted for 90 minutes. The autoclave was then let down and the product was discharged through a bottom outlet valve. Said product comprised 750 g of polypropylene, or 650 g after deducting the amount of the initial charge, corresponding to a productivity of 3.25 kg of propylene/g of catalyst.

Example 4

Preparing the Catalyst 350 mg (0.1 mmol) of bis-indenylzirconium dimethyl are dissolved in 30 ml of absolute toluene. 150 mg (0.1 mmol) of trifluoromethanesulfonic acid (2 molar in toluene) are added. 1.7 g (20 mmol) of amorphous $AlF_3$ are added to the reaction mixture. The reaction mixture is stirred at room temperature for 30 minutes.

Ethylene polymerization:

A 1 l autoclave is charged with 80 mg of aluminum triethyl (as a solution in heptane) and 400 ml of isobutane. Ethylene is injected to a pressure of 40 bar, the autoclave is conditioned at 70° C., and then 3 ml of the above suspension are added via an airlock. After 65 minutes the polymerization was discontinued by letting down the autoclave. This gave 45 g of polyethylene, η value: 14.7 dl/g.

Example 5

Preparing the Catalyst 350 mg (1 mmol) of bis-indenylzirconium dimethyl are dissolved in 30 ml of absolute toluene. 150 mg (1 mmol) of trifluoromethanesulfonic acid (2 molar in toluene) are added and are dissolved at 80° C. for 30 minutes. 1.7 g (20 mmol) of amorphous $AlF_3$ are added to the reaction mixture. The reaction mixture is stirred at 90° C. for 1 h. Then 10 g of silica gel (from Grace SG 332, purified by heating at 130° C. and treated with TiBAL) are added. The solvent is removed by filtration and the residue is washed with heptane. Drying under reduced pressure gives 11.9 g of a free-flowing solid.

Ethylene Polymerization:

A 1 l autoclave is charged with 120 mg of aluminum triethyl (as a solution in heptane) and 400 ml of isobutane. Ethylene is injected to a pressure of 40 bar, the autoclave is conditioned at 70° C., and then 335 mg of the supported catalyst are added via an airlock. After 90 minutes the polymerization was discontinued by letting down the autoclave. This gave 90 g of polyethylene, η value: 49.5 dl/g.

Example 6

Preparing the Catalyst 540 mg (0.1 mmol) of di(2,6-diisopropylphenyl)-2,3-dimethyldiazabutadienepalladium dimethyl were dissolved in 30 ml of absolute toluene. 150 mg (0.1 mmol) of trifluoromethanesulfonic acid (2 molar in toluene) were added. 1.7 g (20 mmol) of amorphous $AlF_3$ were added to the reaction mixture. The reaction mixture was stirred at room temperature for 30 minutes.

Ethylene polymerization

A 1 l autoclave was charged with 80 mg of aluminum triethyl (as a solution in heptane) and 400 ml of isobutane. Ethylene was injected to a pressure of 40 bar, the autoclave is conditioned at 70° C., and then 3 ml of the above suspension were added via an airlock. After 65 minutes the polymerization was discontinued by letting down the autoclave. This gave 31 g of viscous polyethylene, with $M_w$=40,000 and $M_w/M_n$=2.

TABLE

Polymerizations with AlF$_3$-comprising catalysts

| Cat. Ex. | Complex | Cation former | Support/ Activator | Monomer(s)[3] | Componente D)[4] | Polymerization Examples |
|---|---|---|---|---|---|---|
| 2.1 | Cp$_2$ZrMe$_2$ | HSbF$_6$ | AlF$_3$ | C$_2$= | n-BuLi | 3.1 |
| 2.2 | Cp$_2$ZrCl$_2$ | SbF$_5$ | AlF$_3$ | C$_2$= | n-BuLi | 3.1 |
| 2.3 | SiMe$_2$(2-Me-BInd)$_2$ZrCl$_2$[1] | SbF$_5$ | AlF$_3$ | C$_3$= | TiBAL/DiBAH | 3.3 |
| 2.1 | Cp$_2$ZrMe$_2$ | HSbF$_6$ | AlF$_3$ | C$_2$=/C$_6$= | n-BuLi | 3.2 |
| 2.2 | Cp$_2$ZrCl$_2$ | SbF$_5$ | AlF$_3$ | C$_2$=/C$_6$= | n-BuLi | 3.2 |
| 4 | Ind$_2$ZrMe$_2$[2] | CF$_3$SO$_3$H | AlF$_3$ | C$_2$= | AlEt$_3$ | 4 |
| 5 | Ind$_2$ZrMe$_2$[2] | CF$_3$SO$_3$H | AlF$_3$ + SiO$_2$ | C$_2$= | AlEt$_3$ | 5 |
| 6 | diazabutadiene PdMe$_2$ | CF$_3$SO$_3$H | AlF$_3$ | C$_2$= | AlEt$_3$ | 6 |

[1] Dimethylsilylenebis (2-methyl-4,5-benzoindenyl) zirconocene dichloride
[2] Bis(indenyl) zirconium dimethyl
[3] C$_2$= = ethylene, C$_3$= = propylene, C$_6$= = 1-hexene
[4] TiBAL = Triisobutylaluminum, DiBAH = Diisobutylaluminum hydride

We claim:

1. A catalyst system suitable for polymerizing unsaturated monomers and consisting essentially of active constituents obtained by reacting A) a transition metal compound selected from the group consisting of complexes with ligands comprising an element from group 15 of the Periodic Table of the Elements where the transition metal is selected from the elements Ti, Zr, Hf, Sc, V, Nb, Ta, Cr, Mo, W, Fe, Co, Ni, Pd or Pt or from an element of the rare earth metals, of metallocene complexes and of half-sandwich complexes with B) aluminum trifluoride, C) a cation-forming compound other than B), selected from the group consisting of moderate and positively charged Lewis acids of the formula $$MetR'_n, [MetR'_{n+1}]^+[An]^- \text{ or } [MetR'_{n-1}]^+[An]^-$$

where

Met is an element from groups 13 to 16 of the Periodic Table of Elements,

R' is inorganic or organic radicals which can be the same or different, n is an integer from 3 to 5 and represents the valence of Met, and

[An]$^-$ is an anion,

Brnsted acids with an anion of low nucleophilicity, of the formula $$[MetR'_{n+1}]^-,$$

where

Met is an element from groups 13 to 15 of the Periodic Table of Elements,

R' is inorganic or organic radicals which can be the same or different, and n is an integer from 2 to 5 and represents the valence of Met, anions of low nucleophilicity, of the formula $$R'SO_3^-,$$

where

R' is an inorganic or organic radical, strong neutral Lewis acids of the formula II $$M^3X^1X^2X^3 \qquad \text{II}$$

where

M$^3$ is an element from the main group III of the Periodic Table, and

X$^1$, X$^2$ and X$^3$ are hydrogen, C$_1$- to C$_{10}$-alkyl, C$_6$- to C$_{15}$-aryl, alkylaryl, arylalkyl, haloalkyl or haloaryl having in each case 1 to 10 carbon atoms in the alky radical and 6 to 20 carbon atoms in the aryl radical, or are fluorine, chlorine, bromine or iodine, and ionic compounds having strong Lewis-acid cations, of the formula III $$[(Y^{a+})Q_1Q_2 \ldots Q_z]^{d+} \qquad \text{III}$$

where

Y is an element of main groups I to VI or of subgroups I to VIII of the Periodic Table, Q$_1$ to Q$_z$ are radicals bearing a single negative charge, selected from the group consisting of C$_1$–C$_{28}$-alkyl, C$_6$- to C$_{15}$-aryl, alkylaryl, arylalkyl, haloalkyl, haloaryl each having 6 to 20 carbon atoms in the aryl and 1 to 28 carbon atoms in the alkyl radical, C$_3$- to C$_{10}$-cycloalkyl, which can be unsubstituted or substituted by C$_1$- to C$_{10}$-alkyl groups, or are halogen, C$_1$- to C$_{28}$-alkoxy, C$_6$- to C$_{15}$-aryloxy, silyl and mercaptyl groups a is an integer from 1 to 6 and z is an integer from 0 to 5, d being the difference a-z but being greater than or equal to 1, and, optionally, D) one or more metal compounds of the formula IV $$M^1(R^{21})_r(R^{22})_s(R^{23})_t \qquad \text{IV}$$

where

M$^1$ is an alkali metal, an alkaline earth metal or a metal from group 13 of the Periodic Table, R$^{21}$ is hydrogen, C$_1$–C$_{10}$-alkyl, C$_6$–C$_{15}$-aryl, alkylaryl or arylalkyl having in each case 1 to 10 carbon atoms in the alkyl radical and 6 to 20 carbon atoms in the aryl radical, R$^{22}$ and R$^{23}$ are hydrogen, halogen, C$_1$–C$_{10}$-alkyl, C$_6$–C$_{15}$-aryl, alkylaryl, arylalkyl or alkoxy having in each case 1 to 10 carbon atoms in the alkyl radical and 6 to 20 carbon atoms in the aryl radical r is an integer from 1 to 3, and s and t are integers from 0 to 2, the sum r+s+t corresponding to the valence of $M^1$.

2. A catalyst system as claimed in claim 1, where the aluminum trifluoride is amorphous.

3. A catalyst system as claimed in claims 1, where the transition metal compound used is of the formula I

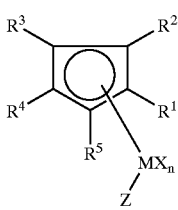

where

M is titanium, zirconium, hafnium, vanadium, niobium or tantalum or an element from subgroup III of the Periodic Table or from the lanthanoids, X is fluorine, chlorine, bromine, iodine, hydrogen, $C_1$–$C_{10}$-alkyl, $C_6$–$C_{15}$-aryl, alkylaryl having 1 to 10 carbons in the alkyl radical and 6 to 20 carbons in the aryl radical, —$OR^6$ or —$NR^6R^7$, n is an integer between 1 and 3, n corresponding to the valence of M minus 2, and where $R^6$ and $R^7$ are $C_1$–$C_{10}$-alkyl, $C_6$–$C_{15}$-aryl, alkylaryl, arylalkyl, fluoroalkyl or fluoroaryl having in each case 1 to 10 carbons in the alkyl radical and 6 to 20 carbons in the aryl radical, $R^1$ to $R^5$ are hydrogen, $C_1$–$C_{10}$-alkyl, 5–7 membered cycloalkyl which can in turn carry a $C_1$–$C_{10}$-alkyl as substituent, $C_6$–$C_{15}$-aryl or arylalkyl, where two adjacent radicals may if desired together be saturated or unsaturated cyclic groups having 4 to 15 carbons, or are $Si(R^8)_3$ where $R^8$ is $C_1$–$C_{10}$-alkyl, $C_3$–$C_{10}$-cycloalkyl or $C_6$–$C_{15}$-aryl,

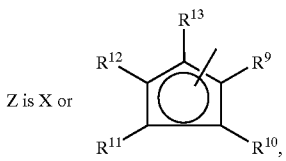

Z is X or and where the radicals $R^9$ to $R^{13}$ are hydrogen, $C_1$–$C_{10}$-alkyl, 5–7-membered cycloalkyl which can in turn carry a $C_1$–$C_{10}$-alkyl substituent, $C_6$–$C_{15}$-aryl or arylalkyl and where two adjacent radicals may if desired together be saturated or unsaturated cyclic groups having 4 to 15 carbons, or are $Si(R^{14})_3$ where $R^{14}$ is $C_1$–$C_{10}$-alkyl, $C_6$–$C_{15}$-aryl or $C_3$–$C_{10}$-cycloalkyl, or where the radicals $R^4$ and Z together form a group —$R^{15}$—A— in which

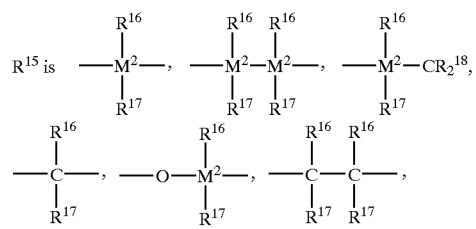

=$BR^{16}$, =$AlR^{16}$, —Ge—, —Sn—, —O—, —S—, =SO, =$SO_2$, =$NR^{16}$, =CO, =$PR^{16}$ or =$P(O)R^{16}$, where $R^{16}$, $R^{17}$ and $R^{18}$ are the same or different and are hydrogen, halogen, $C_1$–$C_{10}$-alkyl, $C_1$–$C_{10}$-fluoroalkyl, $C_6$–$C_{10}$-fluoroaryl, $C_6$–$C_{10}$-aryl, $C_1$–$C_{10}$-alkoxy, $C_2$–$C_{10}$-alkenyl, $C_7$–$C_{40}$-arylalkyl, $C_8$–$C_{40}$-arylalkenyl or $C_7$–$C_{40}$-alkylaryl, or where two adjacent radicals in each case form a ring with the atoms linking them, and $M^2$ is silicon, germanium or tin, A is —O—, —S—, $>NR^{19}$ or $>PR^{19}$, where $R^{19}$ is $C_1$–$C_{10}$-alkyl, $C_6$–$C_{15}$-aryl, $C_3$–$C_{10}$-cycloalkyl, alkylaryl or $Si(R^{20})_3$, $R^{20}$ is hydrogen, $C_1$–$C_{10}$-alkyl, $C_6$–$C_{15}$-aryl which may in turn be substituted by $C_1$–$C_4$-alkyls, or is $C_3$–$C_{10}$-cycloalkyl or where the radicals $R^4$ and $R^{12}$ together form a group —$R^{15}$—.

4. A catalyst system as claimed in claim 1, where component D) is an organometallic compound.

5. A process for preparing a catalyst system suitable for polymerizing unsaturated monomers, by reacting active constituents consisting essentially of A) a transition metal compound selected from the group consisting of complexes with ligands comprising an element from-group 15 of the Periodic Table of the Elements where the transition metal is selected from the elements Ti, Zr, Hf, Sc, V, Nb, Ta, Cr, Mo, W, Fe, Co, Ni, Pd or Pt or from an element of the rare earth metals, metallocene complexes and half-sandwich complexes with B) aluminum trifluoride, C) a cation-forming compound other than B), selected from the group consisting of moderate and positively charged Lewis acids of the formula $MetR'_n$, $[MetR'_{n+1}]^+[An]^-$ or $[MetR'_{n-1}]^+[An]^-$ where Met is an element from groups 13 to 16 of the Periodic Table of Elements, R' is inorganic or organic radicals which can be the same or different, n is an integer from 3 to 5 and represents the valence of Met, and $[An]^-$ is an anion, Bronsted acids with an anion of low nucleophilicity, of the formula $[MetR'_{n+1}]^-$, where Met is an element from groups 13 to 15 of the Periodic Table of Elements, R' is inorganic or organic radicals which can be the same or different, and n is an integer from 2 to 5 and represents the valence of Met, anions of low nucleophilicity, of the formula $$R'SO_3^-,$$

where

R' is an inorganic or organic radical, strong neutral Lewis acids of the formula II $$M^3X^1X^2X^3 \qquad \text{II}$$

where $M^3$ is an element from the main group III of the Periodic Table, and $X^1$, $X^2$ and $X^3$ are hydrogen, $C_1$- to $C_{10}$-alkyl, $C_6$- to $C_{15}$-aryl, alkylaryl, arylalkyl, haloalkyl or haloaryl having in each case 1 to 10 carbon atoms in the alky radical and 6 to 20 carbon atoms in the aryl radical, or are fluorine, chlorine, bromine or iodine, and ionic compounds having strong Lewis-acid cations, of the formula III $$[(Y^{a+})Q_1Q_2 \ldots Q_z]^{d+} \qquad \text{III}$$

where

Y is an element of main groups I to VI or of subgroups I to VII of the Periodic Table, $Q_1$ to $Q_z$ are radicals bearing a single negative charge, selected from the group consisting of $C_1$–$C_{28}$-alkyl, $C_6$- to $C_{15}$-aryl, alkylaryl, arylalkyl, haloalkyl, haloaryl each having 6 to 20 carbon atoms in the aryl and 1 to 28 carbon atoms in the alkyl radical, $C_3$- to $C_{10}$-cycloalkyl, which can be unsubstituted or substituted by $C_1$- to $C_{10}$-alkyl groups, or are halogen, $C_1$- to $C_{28}$-alkoxy, $C_6$- to $C_{15}$-aryloxy, silyl or mercaptyl groups a is an integer from 1 to 6 and z is an integer from 0 to 5, d being the difference a-z but being greater than or equal to 1, and, optionally, D) one or more metal compounds of the formula IV $$M^1(R^{21})_r(R^{22})_s(R^{23})_t \qquad \text{IV}$$

where $M^1$ is an alkali metal, an alkaline earth metal or a metal from group 13 of the Periodic Table, $R^{21}$ is hydrogen, $C_1$–$C_{10}$-alkyl, $C_6$–$C_{15}$-aryl, alkylaryl or arylalkyl having in each case 1 to 10 carbon atoms in the alkyl radical and 6 to 20 carbon atoms in the aryl radical, $R^{22}$ and $R^{23}$ are hydrogen, halogen, $G_1$–$C_{10}$-alkyl, $C_6$–$C_{15}$-aryl, alkylaryl, arylalkyl or alkoxy having in each case 1 to 10 carbon atoms in the alkyl radical and 6 to 20 carbon atoms in the ary radical r is an integer from 1 to 3, and s and t are integers from 0 to 2, the sum r+s+t corresponding to the valence of $M^1$.

6. A process for preparing polymers based on monomers with C—C double bond and/or C—C triple bond, by polymerizing these monomers in the presence of a catalyst system as claimed in claims 1.

7. A process for preparing polymers as claimed in claim 6, where the monomers with C—C double bond are selected from the group consisting of $C_2$–$C_{20}$-alk-1-enes and $C_8$–$C_{20}$ vinylaromatic compounds.

* * * * *

UNITED STATES PATENT AND TRADEMARK OFFICE
CERTIFICATE OF CORRECTION

PATENT NO. : 6,500,907 B1
DATED : December 31, 2002
INVENTOR(S) : Sueling et al.

It is certified that error appears in the above-identified patent and that said Letters Patent is hereby corrected as shown below:

<u>Column 15,</u>
Line 51, "Brnsted" should be -- Brönsted --.

<u>Column 17,</u>
Line 9, "claims 1" should be -- claim 1 --.

<u>Column 18,</u>
Line 42, "from-group" should be -- from group --.

<u>Column 19,</u>
Line 34, "VII" should be -- VIII --.

<u>Column 20,</u>
Line 4, "or" should be -- and --;
Line 22, "$G_1$-$C_{10}$-alkyl" should be -- $C_1$-$C_{10}$-alkyl --;
Line 25, "ary" should be -- aryl --.
Line 32, "claims 1" should be -- claim 1 --.

Signed and Sealed this

Fifteenth Day of April, 2003

JAMES E. ROGAN
*Director of the United States Patent and Trademark Office*